United States Patent Office 3,277,126
Patented Oct. 4, 1966

3,277,126
5β,19-CYCLOANDROST-6-ENES
John S. Tadanier, Chicago, Ill., assignor to Abbott Laboratories, Chicago, Ill., a corporation of Illinois
No Drawing. Filed Mar. 2, 1965, Ser. No. 436,638
5 Claims. (Cl. 260—397.4)

The present invention is directed to 17-substituted 3-methoxy-5β,19-cycloandrost-6-enes and a process for preparing these compounds. These new compounds are useful androgens and are growth-regulating agents when administered to warm-blooded animals. They have the structure

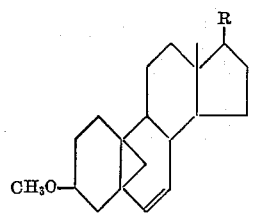

wherein R is oxygen, hydroxy, or acetoxy. The new compounds can conveniently be made by treating 3β-methoxy-6-hydroxy-5β,19-cycloandrostan-17-ones (the 6α-hydroxy compounds is described in Tetrahedron Letters No. 21, pages 1345–52, 1964) with methanesulfonyl chloride in pyridine, and isolating from the reaction mixture the 3β-methoxy-5β,19-cycloandrost-6-en-17-one which can be converted by known procedures into the corresponding 17-hydroxy compound and, in turn, to the 17-acetoxy analog. The reaction with methanesulfonyl chloride can be carried out at a temperature between −10° and 50° C., but preferably between 0° C. and room temperature. At least one mole equivalent of methanesulfonyl chloride should be present to obtain good yields of the desired end product; however, the methanesulfonyl chloride may be present in a large excess which can easily be destroyed after completion of the reaction by the addition of water.

In a preferred embodiment, the reactants are brought together under ice cooling and stirring, and after the addition of the methanesulfonyl chloride to the steroidal starting material is completed, the reaction mixture is allowed to stand for at least one hour at room temperature. The reaction mixture is then diluted with water which may contain, dissolved therein, a neutral, inert salt, e.g. sodium chloride. The addition of water destroys any excess of methane-sulfonyl chloride. Ether is optionally added to dissolve some of the organic by-products. The aqueous phase is separated, buffered to a pH of 7–9, and extracted in a continuous manner with an inert, water-immiscible organic solvenfit for a period of at least 24 hours Examples of useful inert solvents for the extraction include ether, chloroform, methylene chloride, benzene, toluene and the like. Of course, the lower boiling solvents are preferred for the ease of their removal. The desired steroid can be isolated from the solvent and purified in routine fashion. The term "inert" is used to express that said solvent does not react with any of the components present in the reaction mixture.

In order to illustrate the process of the present invention, reference is made to the following examples which are not meant to limit the invention.

EXAMPLE 1

3β-methoxy-5β,19-cycloandrost-6-en-17-one

A solution of 510.6 mg. 3β-methoxy-6-hydroxy-5β,19-cycloandrostan-17-one in 10 ml. of pyridine is cooled in an ice bath and 0.52 ml. of methanesulfonyl chloride is added to the stirred solution. Stirring is continued in the ice bath for 10 minutes and the resulting solution is then allowed to stand at room temperature for 3 hours. The resulting mixture is shaken with a mixture of 100 ml. of ether and 70 ml. of 10% aqueous sodium chloride The aqueous phase is separated and extracted with 100 ml. of ether. The ether solutions are washed in series with two 50-ml. portions of 5% aqueous sodium bicarbonate.

The combined sodium chloride solution and the two sodium bicarbonate solutions are diluted to about 250 ml. with water and subjected to continuous extraction with chloroform for 4.5 days. The resulting chloroform extract is evaporated and the residue is taken up in 400 ml. of ether. The ether solution is dried over anhydrous magnesium sulfate and the ether is evaporated, leaving 383.5 mg. of a light-orange solid. This product is dissolved in 10 ml. of benzene and placed on a chromatographic column containing 15 grams of neutral, activity III alumina. Elution with 50 ml. of benzene yields 310.8 mg. of 3β - methoxy - 5β,19 - cycloandrost-6-en-17-one which, after recrystallization from ether/pentane, produces 191.5 mg. of the pure compound melting at 100–103° C. and having $[\alpha]_D^{24}$ of 70.5° (chloroform). The analytical values are in good agreement with the values calculated from the empirical formula $C_{20}H_{28}O_2$. Either the 6α- or the 6β-hydroxy-5β,19-cyclosteroids may be used as starting materials in this example.

EXAMPLE 2

3β-methoxy-17β-hydroxy-5β,19-cycloandrost-6-ene

A solution of 50 mg. of 3β-methoxy-5β,19-cycloandrost-6-en-17-one in 5 ml. of methanol and a freshly prepared solution of 200 mg. of sodium borohydride in 3.5 ml. of methanol are combined at room temperature. After 30 minutes, the solution is poured into water and the mixture is extracted with ether. The ether phase is washed with water and dried over anhydrous magnesium sulfate. Evaporation of the ether leaves 3β-methoxy-17β-hydroxy-5β,19-cycloandrost-6-ene which is purified by crystallization from ether/pentane. The analytical values are in good agreement with those calculated from the empirical formula $C_{20}H_{30}O_2$.

EXAMPLE 3

3β-methoxy-17β-acetoxy-5β,19-cycloandrost-6-ene

A solution of 35 mg. of the compound of Example 2 in 3 ml. of pyridine is treated with 0.4 ml. of acetic anhydride. After allowing the solution to stand for 6 hours at room temperature, it is poured into water and the aqueous mixture is extracted with ether. The ether solution is washed with water and dried over anhydrous magnesium sulfate. Evaporation of the solvent leaves 3β-methoxy-17β-acetoxy-5β,19-cycloandrost-6-ene which is purified by recrystallization from ether/pentane. The analytical values are in good agreement with those calculated from the empiricial formula $C_{22}H_{32}O_3$.

Others may practice the invention in any of the numerous ways which will be suggested to one skilled in the art by the present disclosure. All such practice of the invention is considered a part hereof provided it falls within the scope of the appended claims.

I claim:
1. The process comprising treating 3β-methoxy-6-hydroxy-5β,19-cycloandrost-17-one with at least a molar equivalent of methanesulfonyl chloride in pyridine at a temperature between −10° C. and 50° C., adding water, adjusting the pH to between 7 and 9, subjecting the aqueous mixture to continuous extraction with an inert, water-immiscible organic solvent, and recovering therefrom the 3β-methoxy-5β,19-cycloandrost-6-en-17-one.

2. A compound of the formula
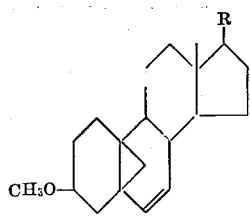
wherein R is selected from the group consisting of hydroxy, acetoxy and oxo.
3. 3β-methoxy-5β,19-cycloandrost-6-en-17-one.
4. 3β-methoxy-17β-hydroxy-5β,19-cycloandrost-6-en.
5. 3β-methoxy-17β-acetoxy-5β,19-cycloandrost-6-en.
No references cited.
LEWIS GOTTS, *Primary Examiner.*
HENRY A. FRENCH, *Assistant Examiner.*